US012574764B2

(12) United States Patent (10) Patent No.: US 12,574,764 B2
Ficara et al. (45) Date of Patent: Mar. 10, 2026

(54) CLIENT COOPERATIVE TROUBLESHOOTING

(71) Applicant: Cisco Technology, Inc., San Jose, CA (US)

(72) Inventors: Domenico Ficara, Essertines-sur-Yverdon (CH); Leo Caldarola, Morrens (CH); Amine Choukir, Lausanne (CH); Jerome Henry, Pittsboro, NC (US); Ugo M. Campiglio, Morges (CH); Arun G. Khanna, Sunnyvale, CA (US)

(73) Assignee: Cisco Technology, Inc.

( * ) Notice: Subject to any disclaimer, the term of this patent is extended or adjusted under 35 U.S.C. 154(b) by 357 days.

(21) Appl. No.: 18/300,185

(22) Filed: Apr. 13, 2023

(65) Prior Publication Data

US 2024/0349089 A1      Oct. 17, 2024

(51) Int. Cl.
|  |  |
|---|---|
| *H04W 24/04* | (2009.01) |
| *H04L 41/0654* | (2022.01) |
| *H04L 41/0686* | (2022.01) |
| *H04W 84/12* | (2009.01) |

(52) U.S. Cl.
CPC ......... *H04W 24/04* (2013.01); *H04L 41/0654* (2013.01); *H04L 41/0686* (2013.01); *H04W 84/12* (2013.01)

(58) Field of Classification Search
CPC .. H04W 24/04; H04W 84/12; H04L 41/0654; H04L 41/0686; H04L 41/0631; H04L 41/0695; H04L 41/042; H04L 43/50
See application file for complete search history.

(56) References Cited

U.S. PATENT DOCUMENTS

| | | | |
|---|---|---|---|
| 7,251,685 B1 | 7/2007 | Mldiz | |
| 7,747,740 B2 * | 6/2010 | Doshi | H04W 24/08 |
| | | | 713/168 |
| 9,183,072 B1 | 11/2015 | Makuch et al. | |
| 9,652,364 B1 * | 5/2017 | Kaila | G06F 11/366 |
| 11,838,169 B1 | 12/2023 | Sudletsky et al. | |
| 2002/0146023 A1 | 10/2002 | Myers | |
| 2004/0236851 A1 | 11/2004 | Kuan et al. | |
| 2010/0246416 A1 | 9/2010 | Sinha et al. | |
| 2011/0131295 A1 * | 6/2011 | Jolfaei | G06F 11/366 |
| | | | 709/219 |

(Continued)

OTHER PUBLICATIONS

International Search Report and Written Opinion for International Application No. PCT/US2024/023921, mailed Jun. 17, 2024, 15 Pages.

(Continued)

*Primary Examiner* — Santiago Garcia
(74) *Attorney, Agent, or Firm* — Merchant & Gould P.C.

(57) ABSTRACT

Client cooperative troubleshooting may be provided. A first computing device may receive, from a second computing device, a troubleshooting request in accordance with a troubleshooting capability protocol. Then the first computing device may signal troubleshooting aid messaging indicating troubleshooting is being performed and defining troubleshooting aid data. The troubleshooting request may then be performed in accordance with the troubleshooting capability protocol. The troubleshooting aid data may be received from a third computing device.

20 Claims, 3 Drawing Sheets

(56)          References Cited

U.S. PATENT DOCUMENTS

| | | | |
|---|---|---|---|
| 2011/0280242 A1* | 11/2011 | Kugel | H04L 12/4625 |
| | | | 370/392 |
| 2012/0246303 A1 | 9/2012 | Petersen et al. | |
| 2013/0295854 A1 | 11/2013 | Olson et al. | |
| 2014/0132777 A1 | 5/2014 | Beyabani | |
| 2015/0006879 A1 | 1/2015 | Naim et al. | |
| 2015/0117453 A1* | 4/2015 | Mosko | H04L 45/74591 |
| | | | 370/392 |
| 2015/0208310 A1* | 7/2015 | Taneja | H04W 36/0044 |
| | | | 370/331 |
| 2015/0382212 A1* | 12/2015 | Elliott | H04L 61/5007 |
| | | | 370/252 |
| 2016/0112886 A1 | 4/2016 | Malik et al. | |
| 2017/0063651 A1* | 3/2017 | Wang | H04L 43/20 |
| 2017/0286560 A1* | 10/2017 | Shao | H04L 67/10 |
| 2018/0131751 A1* | 5/2018 | Jones | H04L 67/566 |
| 2018/0176101 A1 | 6/2018 | Stephenson et al. | |
| 2019/0097872 A1* | 3/2019 | Lee | H04L 43/50 |
| 2019/0149443 A1 | 5/2019 | Gunasekara et al. | |
| 2020/0036698 A1* | 1/2020 | Ray | G06F 11/0763 |
| 2021/0099369 A1 | 4/2021 | Huang et al. | |
| 2022/0014448 A1* | 1/2022 | Khoury | H04L 43/04 |
| 2024/0250865 A1* | 7/2024 | Moreira Martins | |
| | | | H04L 41/0654 |
| 2024/0323229 A1* | 9/2024 | Bernsen | H04W 12/35 |

OTHER PUBLICATIONS

International Search Report and Written Opinion issued in International Application No. PCT/US2024/023811, mailed Jun. 17, 2024, 15 pages.
Samhat, A. et al. "Automated Troubleshooting in WLAN Networks" IEEE Xplore; Sep. 4, 2007 (4 pages).

* cited by examiner

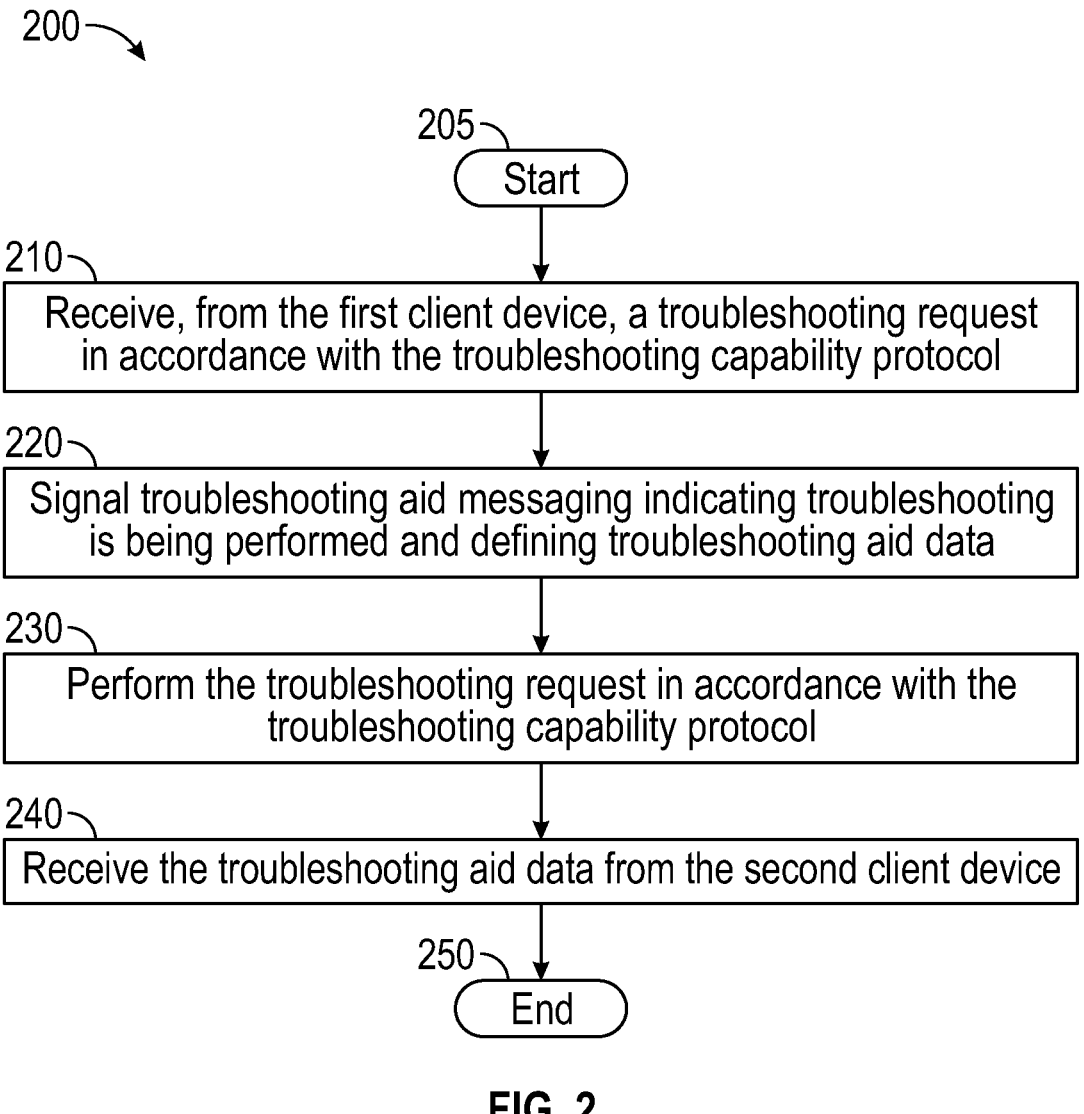

200

205 — Start

210 — Receive, from the first client device, a troubleshooting request in accordance with the troubleshooting capability protocol 220 — Signal troubleshooting aid messaging indicating troubleshooting is being performed and defining troubleshooting aid data 230 — Perform the troubleshooting request in accordance with the troubleshooting capability protocol 240 — Receive the troubleshooting aid data from the second client device 250 — End

CLIENT COOPERATIVE TROUBLESHOOTING

TECHNICAL FIELD

The present disclosure relates generally to providing client cooperative troubleshooting.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for providing client cooperative troubleshooting.

DETAILED DESCRIPTION

Overview

Figure 1:
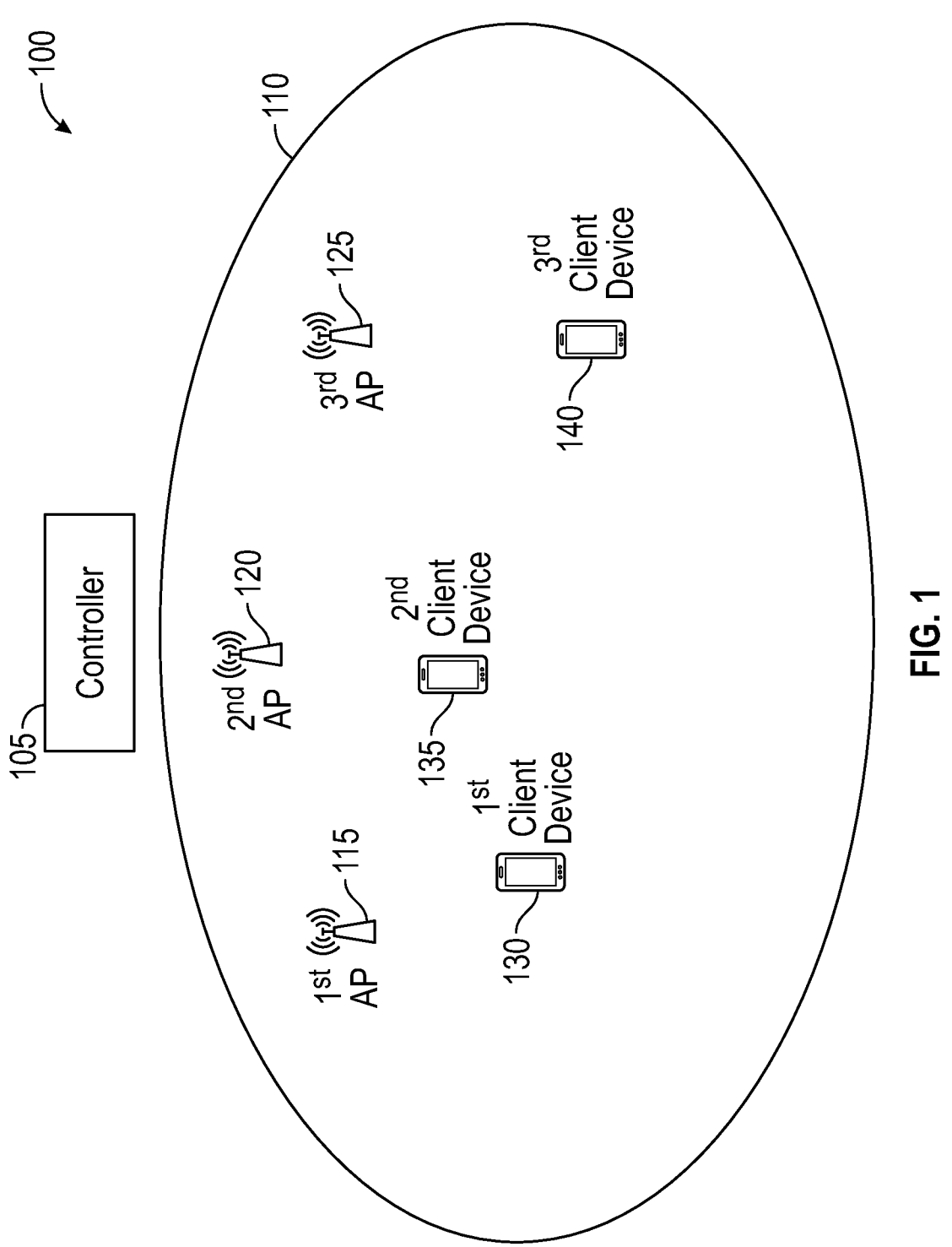
FIG. 1 is a block diagram of an operating environment for providing client cooperative troubleshooting.

Client cooperative troubleshooting may be provided. A first computing device may receive, from a second computing device, a troubleshooting request in accordance with a troubleshooting capability protocol. Then the first computing device may signal troubleshooting aid messaging indicating troubleshooting is being performed and defining troubleshooting aid data. The troubleshooting request may then be performed in accordance with the troubleshooting capability protocol. The troubleshooting aid data may be received from a third computing device.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Troubleshooting Wi-Fi issues may be challenging because the troubleshooting party may only have a partial view of the scene. A process may be provided for a client or a third party non-AP or AP to coordinate their collection of logs and packet captures in a certain location and time, to provide more information to the support teams when an issue is detected. However, there may be a need to scale the process beyond individual clients and not by duplicating the process to N clients. On one hand, adding other clients to the troubleshooting effort may help refine the understanding of the issue, as individual devices (including APs) may miss or misinterpret (e.g., bugs) events or frames. This may be common in troubleshooting efforts, as driver or implementation bugs may be common causes of Wi-Fi issues. On the other hand, adding clients may cause severe overhead. If N clients provide their logs or full Over-the-Air (OTA)-captured packets, the system may be overloaded or the cost of the solution may be significantly increased. Accordingly, embodiments of the disclosure may provide troubleshooting in wireless networks where different stations (e.g., client devices) cooperate and the AP coordinates.

FIG. 1 shows an operating environment 100 providing client cooperative troubleshooting. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

The plurality of APs and the plurality of client devices may use Multi-Link Operation (MLO) where they simultaneously transmit and receive across different bands and channels by establishing two or more links to two or more AP radios. These bands may comprise, but are not limited the 2 GHz band, the 5 GHz band, the 6 GHz band, and the 60 GHz band.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide client cooperative troubleshooting.

The elements described above of operating environment 100 (e.g., controller 105, first AP 115, second AP 120, third AP 125, first client device 130, second client device 135, or third client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

FIG. 2 is a flow chart setting forth the general stages involved in a method 200 consistent with embodiments of the disclosure for providing client cooperative troubleshooting. Method 200 may be implemented using first AP 115, first client device 130, and second client device 135 as described in more detail above with respect to FIG. 1. Ways to implement the stages of method 200 will be described in greater detail below.

Method 200 may begin at starting block 205 and proceed to stage 210 where first AP 115 may receive, from first client device 130, a troubleshooting request in accordance with a troubleshooting capability protocol. For example, first AP 115 and first client device 130 may signal to each other a cooperative troubleshooting protocol capability at association time. This may be signaled, for example, in a capability fields in an Information Element (IE). Some client devices and APs may implement a full version of the troubleshooting protocol (e.g., selective logging as described below), others may implement a simplified version of the protocol (e.g., log everything or nothing), others may not implement the protocol (e.g., legacy clients).

At any time after association, first client device 130 or first AP 115 may trigger the troubleshooting protocol with a request/response exchange (e.g., an action frame). The exchange may include one or more elements used as the trigger, one or more thresholds, and one or more elements to log. For example, the triggers may include frame types 00, subtypes 0, 1, 2, 3 (management/association), the thresholds may include failure or delay>n ms", and the elements to log may include frame type 00 and timestamps. The query may target one or more applications by characterizing the application (e.g., a tuple, Domain Name Service (DNS) response, package name, etc.). The exchange may include a single set of elements or contain a list. The exchange may be allowed to occur at any time and a request/response may augment or update a previous request/response.

The exchange may also include capability information. For example, some systems may be able to monitor frames (e.g., 802.11 frames), but not their payload, thus may have no application monitoring capability. Similarly, some systems may be able to allocate a monitoring buffer, thus allowing for the ability to monitor events that occurred before a failure was detected.

From stage 210, where first AP 115 receives, from first client device 130, the troubleshooting request in accordance with the troubleshooting capability protocol, method 200 may advance to stage 220 where first AP 115 may signal troubleshooting aid messaging indicating troubleshooting is being performed and defining troubleshooting aid data. For example, because of the broadcast nature of wireless and the radio frequency impairment of the transmission (e.g., multi-path, destructive interference, hidden terminal, etc.), troubleshooting may be aided if multiple actors provide their view on the communications over the air. A client device having some issues communicating with its AP may lever-age other client devices (e.g., of the same Basic Service Set Identifier (BSSID)) currently waiting for the channel to become idle. When the issue at hand is a software bug (e.g., preventing one side from understanding the message from the other side) or a Radio Frequency (RF) reachability issue (e.g., obstacle between the client device and the AP), having additional client devices recording their view of the event may provide the visibility that a two-way capture may fail to identify.

Embodiments of the disclosure may define a broadcast, multicast, or unicast messaging to indicate troubleshooting session start, in-progress, and stop. In one embodiment, the messaging may comprise different troubleshooting session start, troubleshooting session in-progress, and troubleshoot-ing session stop messages. In another embodiment, the messaging may comprise a troubleshooting session start message plus time duration (e.g., in time or number of beacons).

First AP 115 may use such messaging to indicate to a set or all of the plurality of client devices that Channel Utili-zation (CU) may temporarily rise slightly because of troubleshooting (e.g., if active probing is performed as part of the troubleshooting session). The messaging may also indicate to client devices that they may see some unusual activity and they might want to roam to another AP or enable a secondary MLO link. For example, if the AP requests the failing client devices to perform active scans and if conse-quently the CU is expected to rise significantly, then this message may be an increment higher than the previous one.

Furthermore, the messaging may also indicate that client devices may be welcome to collect their view on the communication and report back to the AP. This request to collect may be optional because other client devices may or may not support the capability, may or may not be busy with other tasks, and may or may not chose to opt in. In addition the messaging may request the client devices to stay silent for some critical period of time. This message may be unicast and may be expressed in terms of Transmission Units (TUs). In one embodiment, the AP may leverage the duration field to take control of the cell for some duration. This duration may be short, for example, to allow the failing client device to send one frame without needing to compete for channel access.

In one embodiment, first AP 115 may send these messages to all client devices (e.g., first client device 130, second client device 135, and third client device 140) in the Basic Service Set (BSS) (e.g., via broadcast) or to a subset via individual unicast or multicast if groups are already formed. In a variation of this approach, first AP 115 may choose a client device to cooperate with (e.g., second client device 135) based on RF proximity to first client device 130 (e.g., same or similar Received Signal Strength Indicator (RSSI)).

The aforementioned messaging may also define the troubleshooting aid data (e.g., a definition of filters for what data may be interesting for the troubleshooting by first AP 115). This may be shared in the troubleshooting session broadcast, multicast, or unicast message and may include one or more of: i) Media Access Control (MAC) address of interest, direction (e.g. Transmitter Address (TA)/Receiver Address (RA) or Source Address (SA)/Destination Address (DA)); ii) frame filtering rules (e.g., a network protocol analyzer filter string); or extended Berkeley Packet Filter (eBPF) filter logic (e.g., to be compiled or already compiled by AP). In case of eBPF, the AP may provide filtering capabilities and additional post-processing to be executed on clients. Each client may be free to accept or drop the request. If it accepts, it responds positively to the message and may be required to collect the logs described above and report once the activity is done. First AP 115 may query for the troubleshooting aid data for a capture duration (e.g., based on time, frame count, or capture size), but may also query based on event ('report only if event of type X is detected'), and a reporting location target.

Once first AP 115 signals the troubleshooting aid messaging indicating troubleshooting is being performed and defining the troubleshooting aid data in stage 220, method 200 may continue to stage 230 where first AP 115 may perform the troubleshooting request in accordance with the troubleshooting capability protocol. For example, at any point in time, one side may detect an issue of either of two types: i) a failure or ii) a performance threshold (i.e., delay>n ms). In case of failure, the detecting side may request the other side to log. In full protocol and monitoring buffer-capability cases, the detecting side may signal the failure type (e.g., based on the action frame described above in) and a timer (e.g., association failure, 600 ms past). When a monitoring buffer capability was not expressed, the same signaling may occur (e.g., without the timer), and the detecting side re-attempts the exchange, thus causing both sides to log the attempt. In the case of a performance threshold being reached, the detecting side may signal the target element (e.g., based on action frame described above in) along with a request to log.

In both cases, the other side may confirm that it starts logging. In an embodiment of the disclosure, the response may also include a flag signaling whether the responder also detected the flagged issue. In another embodiment, the request and/or the response may also include a logging timer that indicates the duration of the intended logging action.

In yet another embodiment (i.e., basic protocol implementation), each side may only be statically configured to log certain types of events without granularity). Thus the signaling may be limited to "issue detected, please log" for example.

At the end of the logging timer (e.g., either exchanged for full protocol implementers, or determined locally for basic implementations), the logging may stop and the corresponding side may signal the event to the other. The other side may also stop logging. In another embodiment, logging may stop early because of a triggering event, such as 'buffer full', or 'issue no longer detected' (e.g., for more than x seconds). In all cases, the stopping side may signal to the other side.

In one embodiment, the side that triggered the logging may request the log from the other side. In a variation of this embodiment, the logs may be sent to a location expressed by the requester. In all cases, both sides may confirm that the event logs are completed and thus that the event log, seen from both sides, is available for a support team.

From stage 230, where first AP 115 performs the troubleshooting request in accordance with the troubleshooting capability protocol, method 200 may advance to stage 240 where first AP 115 may receive the troubleshooting aid data from second client device 135. For example, as described above, second client device 135 may receive the signaled troubleshooting aid messaging indicating troubleshooting is being performed and defining the troubleshooting aid data. In response to the messaging, second client device 135 may designate itself a third-party observer and capture the troubleshooting aid data. The captured troubleshooting aid data may then be sent to first AP 115. Accordingly, the troubleshooting aid data may provide first AP 115 an improved view of the scene due to second client device 135 collection of logs and packet captures in a certain location and time. This may provide more information to the support teams when an issue is detected. Once first AP 115 receive the troubleshooting aid data from second client device 135 in stage 240, method 200 may then end at stage 250.

Figure 3:
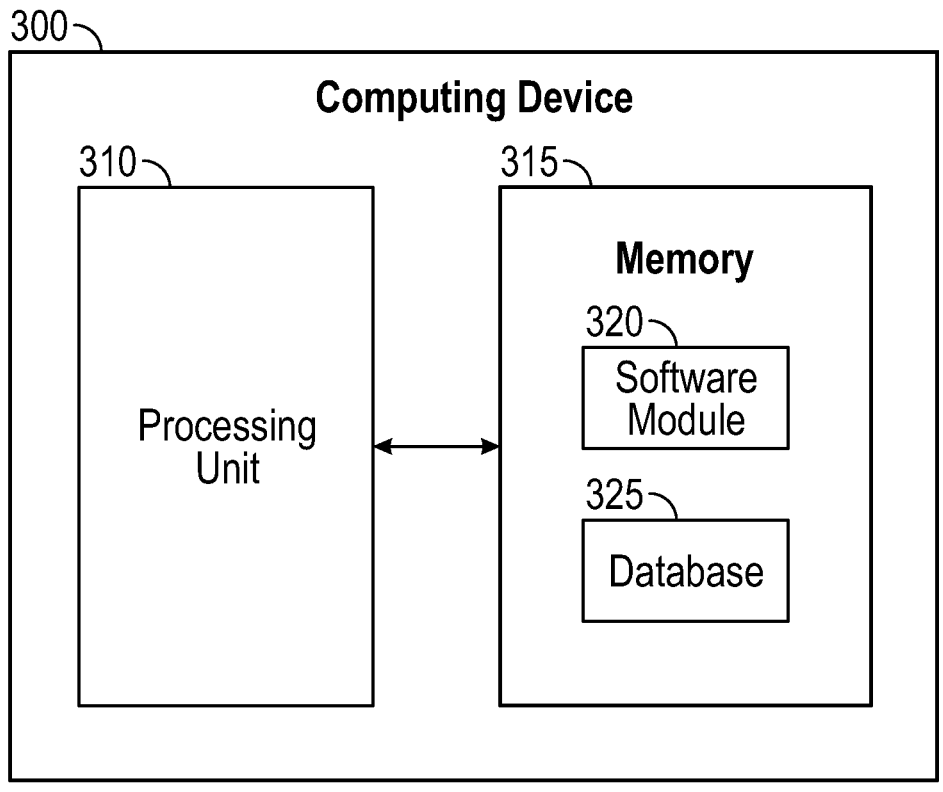
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing client cooperative troubleshooting as described above with respect to FIG. 2. Computing device 300, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a first computing device from a second computing device, a troubleshooting request in accordance with a troubleshooting capability protocol;
   signaling, by the first computing device in response to receiving the troubleshooting request, troubleshooting aid messaging to a third computing device in a Basic Service Set (BSS) of the second computing device to record its view of an event associated with the troubleshooting request, the troubleshooting aid messaging indicating troubleshooting is being performed and defining troubleshooting aid data, wherein the troubleshooting aid data comprises a Media Access Control (MAC) address of interest, a direction comprising a Transmitter Address (TA)/Receiver Address (RA) or a Source Address (SA)/Destination Address (DA)) and a frame filtering rule;
   performing the troubleshooting request in accordance with the troubleshooting capability protocol; and
   receiving the troubleshooting aid data from the third computing device.

2. The method of claim 1, wherein signaling the troubleshooting aid messaging comprises signaling the troubleshooting aid messaging using broadcast.

3. The method of claim 1, wherein signaling the troubleshooting aid messaging comprises signaling the troubleshooting aid messaging using multicast.

4. The method of claim 1, wherein signaling the troubleshooting aid messaging comprises signaling the troubleshooting aid messaging using unicast.

5. The method of claim 1, wherein signaling the troubleshooting aid messaging comprises sending a session start message, a session in-progress message, and a session stop message.

6. The method of claim 1, wherein signaling the troubleshooting aid messaging comprises sending a session start message that indicates a time duration of the troubleshooting.

7. The method of claim 1, wherein signaling the troubleshooting aid messaging comprises determining to send the signaling to the third computing device based on Radio Frequency (RF) proximity to the second computing device as compared to the third computing device.

8. The method of claim 1, wherein receiving the troubleshooting aid messaging causes a computing device to determine that Channel Utilization (CU) will be elevated while troubleshooting is being performed.

9. The method of claim 1, wherein receiving the troubleshooting aid messaging causes a computing device to one of roam and enable a secondary Multi-Link Operation (MLO) link.

10. The method of claim 1, wherein the third computing device, in response to receiving the troubleshooting aid messaging, determines to collect the troubleshooting aid data.

11. The method of claim 1, wherein receiving the troubleshooting aid messaging causes a computing device to stay silent during a period of time.

12. The method of claim 1, wherein signaling the troubleshooting aid messaging defining the troubleshooting aid data comprises defining filters for what data is to be in the troubleshooting aid data.

13. A system comprising:

a memory storage; and a processing unit disposed in a first computing device and coupled to the memory storage, wherein the processing unit is operative to:

receive, from a second computing device, a troubleshooting request in accordance with a troubleshooting capability protocol;

signaling, in response to receiving the troubleshooting request, troubleshooting aid messaging to a third computing device in a Basic Service Set (BSS) of the second computing device to record its view of an event associated with the troubleshooting request, the troubleshooting aid messaging indicating troubleshooting is being performed and defining troubleshooting aid data, wherein the troubleshooting aid data comprises a Media Access Control (MAC) address of interest, a direction comprising a Transmitter Address (TA)/Receiver Address (RA) or a Source Address (SA)/Destination Address (DA)) and a frame filtering rule;

performing the troubleshooting request in accordance with the troubleshooting capability protocol; and receiving the troubleshooting aid data from a third computing device.

14. The system of claim 13, wherein the processing unit being operative to signal the troubleshooting aid messaging comprises the processing unit being operative to determine to send the signaling to the third computing device based on Radio Frequency (RF) proximity to the second computing device as compared to the third computing device.

15. The system of claim 13, wherein the processing unit being operative to signal the troubleshooting aid messaging defining the troubleshooting aid data comprises the processing unit being operative to define filters for what data is to be in the troubleshooting aid data.

16. A non-transitory computer-readable medium that stores a set of instructions which when executed perform a method executed by the set of instructions comprising:

receiving, by a first computing device from a second computing device, a troubleshooting request in accordance with a troubleshooting capability protocol;

signaling, by the first computing device in response to receiving the troubleshooting request, troubleshooting aid messaging to a third computing device in a Basic Service Set (BSS) of the second computing device to record its view of an event associated with the troubleshooting request, the troubleshooting aid messaging indicating troubleshooting is being performed and defining troubleshooting aid data, wherein the troubleshooting aid data comprises a Media Access Control (MAC) address of interest, a direction comprising a Transmitter Address (TA)/Receiver Address (RA) or a Source Address (SA)/Destination Address (DA)) and a frame filtering rule;

performing the troubleshooting request in accordance with the troubleshooting capability protocol; and receiving the troubleshooting aid data from a third computing device.

17. The non-transitory computer-readable medium of claim 16, wherein receiving the troubleshooting aid messaging causes a computing device to determine that Channel Utilization (CU) will be elevated while troubleshooting is being performed.

18. The non-transitory computer-readable medium of claim 16, wherein receiving the troubleshooting aid messaging causes a computing device to one of roam and enable a secondary Multi-Link Operation (MLO) link.

19. The non-transitory computer-readable medium of claim 16, wherein the third computing device, in response to receiving the troubleshooting aid messaging, determines to collect the troubleshooting aid data.

20. The non-transitory computer-readable medium of claim 16, wherein receiving the troubleshooting aid messaging causes a computing device to stay silent during a period of time.

* * * * *